United States Patent

[11] 3,577,805

| [72] | Inventors | Kaxuhiko Ohno;<br>Yoichi Mori, Yokohama, Japan |
|---|---|---|
| [21] | Appl. No. | 822,346 |
| [22] | Filed | Mar. 13, 1969<br>Division of Ser. No. 640,219, May 22, 1967<br>Pat. No. 3,455,185 |
| [45] | Patented | May 4, 1971 |
| [73] | Assignee | Nissan Jidosha Kabushiki Kaisha<br>Yokahama, Japan |
| [32] | Priority | June 30, 1966 |
| [33] | | Japan |
| [31] | | 41/42125 |

[54] TORQUE SPLIT TYPE AUTOMATIC SPEED CHANGE DEVICE
5 Claims, 14 Drawing Figs.

[52] U.S. Cl............................................. 74/688, 74/695
[51] Int. Cl. .............................................F16h 47/08, F16h 37/08
[50] Field of Search........................................74/688, 695

[56] References Cited
UNITED STATES PATENTS

| 1,125,140 | 1/1915 | Lucke ............................. | 74/701X |
| 2,873,618 | 2/1959 | DeLorean ..................... | 74/732X |
| 3,003,367 | 10/1961 | Winchell ....................... | 74/688 |
| 3,024,668 | 3/1962 | Kronogard et al............ | 74/761X |
| 3,209,617 | 10/1965 | Kalversberg.................. | 74/688 |
| 3,256,751 | 6/1966 | Tuck et al...................... | 74/718 |
| 3,355,966 | 12/1967 | Boehm .......................... | 74/761X |
| 3,383,949 | 5/1968 | Edmunds....................... | 74/688 |

*Primary Examiner*—Arthur T. McKeon
*Attorney*—Sughrue, Rothwell, Mion, Zinn and Macpeak ABSTRACT: A torque split type automatic speed change device comprising a hydraulic power transmission means having a pump connected to one end of an engine crankshaft and a turbine, a planetary gear assembly disposed in parallel with the axis of the hydraulic power transmission means, a first power transmission route extending between said pump and said planetary gear assembly through suitable transmitting means, and a second power transmission route extending between said turbine and said planetary gear assembly through another transmitting means, thereby powers transmitted to said planetary gear assembly through said two routes are synthesized.

Patented May 4, 1971  3,577,805
5 Sheets-Sheet 1
Fig. 1
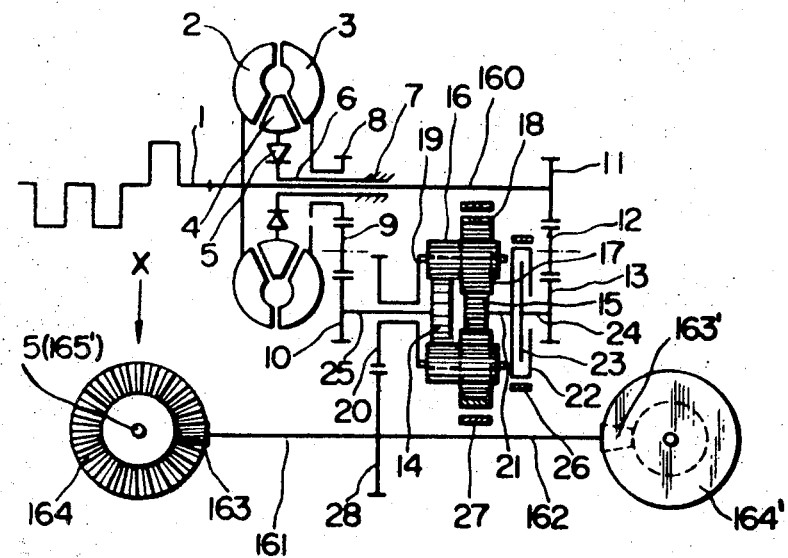
Fig. 2
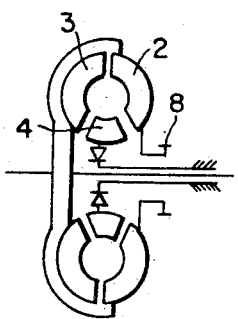
Fig. 1a
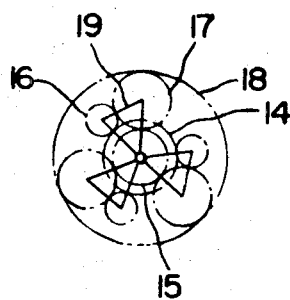
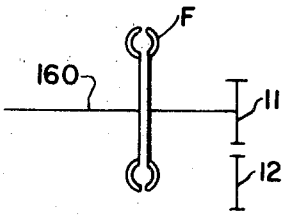
Fig. 1b Patented May 4, 1971

TORQUE SPLIT TYPE AUTOMATIC SPEED CHANGE DEVICE

This application is a divisional of U.S. application Ser. No. 640,219 filed May 22, 1967, now U.S. Pat. No. 3,455,185, July 15, 1969.

This invention relates to an automatic speed change device, more particularly to a torque split type automatic speed change device wherein power is transmitted from a crankshaft of an engine to an output shaft of the automatic speed change device through two split routes consisting of a route including a hydraulic transmission means and another route, so that the power transmitted through such two split routes can be combined together by means of a planetary gear assembly to deliver desired output power therefrom. The hydraulic transmission means usable in the automatic speed change device of the invention includes both a fluid torque converter (to be simply referred to as a "torque converter" hereinafter) and a fluid coupling.

Conventional automatic speed change devices include a hydraulic transmission means and a planetary gear assembly both disposed in tandem at one end of the crankshaft of an engine in alignment with the axial centerline of the crankshaft. Thus, such conventional automatic speed change device is very long in size. Moreover, due to such long size, the conventional automatic speed change devices are not suitable for certain type vehicles.

In order to obviate such difficulty of the conventional speed change device, the inventors proposed a torque split type automatic speed change device in their U.S. Pat. No. 3,446,094. As a result of further studies on such torque split type automatic speed change device, the inventors have succeeded in making further improvement on the torque split type automatic speed change device.

For instance, in a torque split type speed change device disclosed in the aforesaid copending U.S. Pat. application, it is required to connect both ends of an engine crankshaft to the speed change device, and such requirement restricts design of the speed change device, and even for slight change in the model of engine the speed change device has to be completely modified so as to match various dimensions and properties of the engine.

Therefore, an object of the present invention is to provide a torque split type automatic speed change device suitable for use together with various models of engine substantially without modification.

According to the present invention, there is provided a torque split type automatic speed change device comprising a hydraulic power transmission means connected to one end of an engine crankshaft, said hydraulic power transmission means including a pump and a turbine, a long spindle disposed along the axial centerline of the hydraulic transmission means and connected to one of said pump and turbine, a rotary member adapted to revolve around the long spindle and connected to the other one of said pump and turbine, and planetary gear assembly disposed in parallel with said long spindle and connected to said hydraulic transmission means through two split power transmission routes consisting of a route said long spindle and another route including said rotary member, said planetary gear assembly being adapted to synthesize powers transmitted thereto through said two split routes for delivering an output power therefrom.

For a better understanding of the invention, reference is made to the accompanying drawings, in which;

FIG. 1 is a skeleton diagram of a torque split type automatic speed change device embodying the present invention;

FIG. 1A is a skeleton diagram of a modification of the embodiment of FIG. 1;

FIG. 1B is a skeleton diagram of a modification of the embodiment of FIG. 1;

FIG. 2 is a diagrammatic illustration of the manner in which various gear elements of a planetary gear assembly usable in the device of FIG. 1 are engaged each other;

Figure 3:
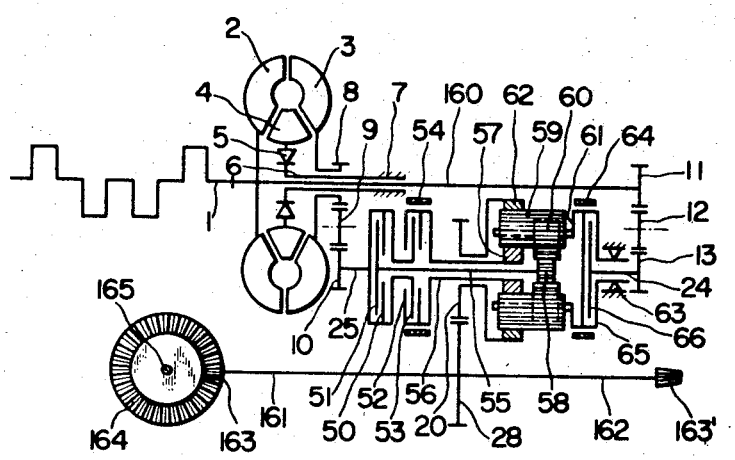
FIG. 3 is a skeleton diagram similar to FIG. 1, illustrating a second embodiment of the present invention.

Referring to FIGS. 1 and 2, illustrating a first embodiment of the present invention, a torque converter V comprises a pump 2 secured to one end of a crankshaft 1 of an engine, a turbine 3, and stator 4. There is a one-way brake 5 inserted between the stator 4 and a stationary sleeve 6 extending from casing 7 of the speed change device. The one-way brake 5 allows rotation of the stator 4 in a normal direction only, but not in the opposite direction. What is meant by the "normal direction" here is the revolving direction of the crankshaft 1 and the pump 2.

A set of gears 8, 9, and 10 transmit the output power of the crankshaft 1 to the first sun gear 14 of a planetary gear assembly to be described in detail hereinafter. The gear 8 of the set is secured to the turbine 3 so as to rotate around a long spindle 160 in a coaxial manner, and acts as a rotary member to be described hereinafter. The gear 10 is secured to one end of a transmission shaft 25, while the first sun gear 14 is secured to the same shaft 25 at the opposite end thereof. Thus, the power delivered to the gear 10 through the turbine 3, rotary member 8, and the gear 9 is fed to the planetary gear assembly.

As illustrated in FIGS. 1A and 1B, the spindle 160 can be connected to the turbine 3 and the rotary member 8 can be connected to the pump 2 and a fluid coupling F can be inserted into the transmission drive.

In this particular embodiment, the long spindle 160 is disposed along the axial centerline of the pump 2 and the turbine 3 and secured to the pump 2 directly. A set of gears 11, 12, and 13 are disposed at the right side end of the spindle 160, FIG. 1, of which the gear 11 is directly secured to the spindle 160, so that the power of the crankshaft 1 is transmitted to a second sun gear 15 of the planetary gear assembly through the long spindle 160, the set of gears 11, 12, and 13, transmission shaft 24 connected to the gear 13, a direct connection clutch 22, 23 to be described hereinafter, and a transmission shaft 21.

The planetary gear assembly of this particular embodiment of the invention comprises the first sun gear 14, the second sun gear 15, first planet gears 16, second planet gears 17, an internal gear 18, and a carrier 19 for holding rotatably the first and the second planet gears 16, 17.

Referring to FIG. 2, illustrating the manner in which the aforesaid various gears of the planetary gear assembly are related each other, the first sun gear 14 is engaged with the first planet gears 16, while the second sun gear 15 is engaged with the second planet gears 17, which second planet gears being engaged with both the first planet gears 16 and the internal gear 18. As shown in FIG. 1, the first sun gear 14 is secured to said transmission shaft 25, while the second sun gear 15 is secured to the other transmission shaft 21.

The direct connection clutch comprises a clutch body 22 secured to the transmission shaft 21, and a clutch plate 23 secured to the transmission shaft 24.

An output gear 20 is integrally secured to the carrier 19, so as to be rotated around the transmission shaft 25.

An output gear 20 in integrally secured to the carrier 19, so as to be rotated around the transmission shaft 25. A gear 28, secured to both a front propeller shaft 161 and a rear propeller shaft 162, is engaged with the output gear 20. The front propeller shaft 161 is provided with a bevel pinion 163 secured at the front end thereof, so as to drive a bevel gear wheel 164 associated with a front axle 165 having front wheels mounted at both ends thereof. Similarly, the rear propeller shaft 162 is provided with a bevel pinion 163' secured at the rear end thereof, so as to drive a bevel gear wheel 164' associated with a rear axle 165' having rear wheels mounted at both side ends thereof.

Figure 10:
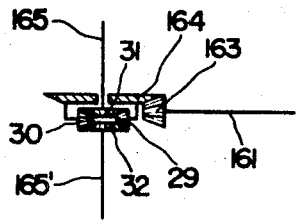
FIG. 10 is a skeleton diagram of a differential gear assembly usable in conjunction with the preceding embodiments at the last stage of transmission system of a vehicle.

The planetary gear assembly synthesizes powers transmitted thereto through the sun gears 14 and 15, and delivers an output power from the output gear 20 to the front and rear wheels (not shown) through a gear 28, propeller shafts 161, 162, bevel pinions 163, 163', bevel gear wheels 164, 164', and front and rear axles 165, 165'. For simplicity, vehicle wheels mounted on the axles and differential gear means located between the axles and the bevel gear wheels are not shown in the FIG. Any suitable conventional differential gear means can be used for such purposes, and FIG. 10 shows an example thereof, which is a plan view taken from the direction shown by an arrow X of FIG. 1. The differential gear means of FIG. 10 is illustrated referring to the front axle only, but the same differential gear means can be also used with the rear axle 165'. The particular example of the differential gear means comprises a pair of bevel pinions 29, 30 and a cooperating pair of side gears 31, 32, and the axes of the bevel pinions 29, 30 are mounted on the bevel gear wheel 164 at right angles with the axis of the gear wheel 164. The axle 165 includes a shaft 165$a$ connected to the side gear 31 and another shaft 165$b$ connected to the side gear 32, and both shafts are driven by the bevel pinions 29, 30 at the same revolving speed as that of the bevel wheel under normal conditions, but each shaft is rotated at a speed different from that of the bevel wheel 164 under differential conditions. Vehicle wheels (not shown) are mounted at outer ends of the shafts 165$a$ and 165$b$, and rotated together with the shafts.

A brake 26 is provided to stop the clutch body 22 as well as the second sun gear 15, while another brake 27 stops the internal gear 18.

In this particular embodiment of the invention, by automatically controlling the brakes 26, 27 together with the clutch 22, 23 by means of a suitable hydraulic mechanism (not shown), the output speed of the speed change device can be varied in two forward stages and one rearward stage. Prior to entering into detailed description of each stage of operation, the relationship between each revolving member of the planetary gear assembly, which is necessary for determination of the speed change ratio, will now be described.

If it is assumed that the revolving speeds of the first sun gear 14, the second sun gear 15, the internal gear 18, and carrier 19 are represented by $S_1$, $S_2R$, and C, respectively, then there are following relations among such revolving speeds.

$C(l_R-1) = -S_1 + Rl_R$ ($\alpha$)

$C(l_S+1) = S_1 + S_2 l_S$ ($\beta$)

Here, $l_R$ and $l_S$ are per unit values of the radii of pitch circles of the internal gear 18 and the second sun gear 15, respectively, based on the radius of the pitch circle of the first sun gear 14.

The speed change ratio $m$ is defined as a quotient obtained by dividing the revolving speed $S_1$ of the first sun gear 14 by the revolving speed C of the carrier 19, namely $S_1/C$. It should be noted that the revolving speed of the carrier 19 is identical with that of the output gear 20. The actual value of the speed change ratio for each operative stage can be determined by setting the revolving speed of stationary members as zero in the aforesaid formulae ($\alpha$) and ($\beta$).

If it is assumed that the pitch circle radius of the transmission gear 8 is identical with that of the transmission gear 10 and the pitch circle radius of the transmission gear 11 is identical with that of the transmission gear 13, and at the same time if it is further assumed that the pitch circle of the output gear 20 is identical with that of the transmission gear 28, then the speed change ratio as defined above will also give a speed change ratio between the revolving speed of the turbine 3 and that of the bevel pinions 162, 163'.

In the following description, the aforesaid conditions of identity of pitch circle radii between such transmission gears as 8 and 10, 11 and 13, and 20 and 28, are to be satisfied, and the speed change ratio $m$ is assumed to represent not only that of the planetary gear assembly but also the speed change ratio between the turbine 3 and the bevel pinions 163, 163'.

The power transmission routes and the speed change ratios for each operative stage of the speed change device of FIGS. 1 and 2 will now be described.

Low speed stage:

The brake 26 is actuated, and the clutch body 22 is held stationary. Thus, the condition of $S_2 = 0$ is achieved, and by substituting such condition into the formula ($\beta$) the speed change ratio $m$ for this low speed stage can be determined as follows.

$m = S_1/C = l_S + 1$

It is apparent that the output gear 20 is rotated at a speed lower than that of the turbine 3.

High speed stage:

The brake 26 is released and the clutch plate 23 is engaged with the clutch body 22. Thus, the second sun gear 15 is rotated at the same revolving speed as that of the crankshaft 1, while the first sun gear 14 is rotated at the same speed as the turbine 3 of the torque converter V, and the carrier 19 having the output gear 20 integral therewith is rotated at an intermediate speed between the crankshaft 1 and the turbine 3.

In this particular embodiment of the invention, the input power to the first sun gear 14 is delivered from the crankshaft 1 through a route including the torque converter V, while the input power to the second sun gear 15 is delivered from the crankshaft 1 through a rigid mechanical route including the clutch 22, 23. Accordingly, the crankshaft power is delivered through the two split routes, and the overall mechanical efficiency thereof is made higher than that of a speed change device using only one transmission route including a torque converter, as described in the inventor's copending U.S. Pat. No. 3,446,094.

When a vehicle equipped with the speed change device of FIG. 1 is run at a high speed, the torque converter V thereof is operated in a so-called coupled state, and the turbine 3 is revolved substantially at the same speed as that of the pump 2, which is in turn the same as that of the crankshaft 1. The speed change ratio $m$ for this high speed stage can be determined as follows by substituting $S_1 \approx S_2$ in the aforesaid formula ($\beta$).

$m = S_1/C \approx 1$

Rearward stage:

The brake 27 is actuated. Then, the internal gear 18 is held stationary, and the carrier 19 is rotated together with the output gear 20 at a speed lower than that of the first sun gear 14 or the turbine 3. By substituting R=0 to the formula ($\alpha$), the speed change ratio $m$ for this stage can be given by $m = S_1/C = (l_R - 1)$.

Operative conditions of various parts of the speed change device of FIGS. 1 and 2 in each speed change stage are summarized in Table I.

TABLE I

| Operative stage | Brake 26 | Clutch 22-23 | Brake 27 | Speed change ratio, m |
|---|---|---|---|---|
| Forward, low speed | Actuated | Disengaged | Released | $l_S+1$ |
| Forward, high speed | Released | Engaged | do | 1 |
| Rearward | do | Disengaged | Actuated | $-(l_R-1)$ |

Figure 11:
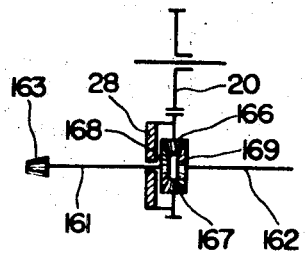
FIG. 11 is a skeleton diagram of an intermediate differential gear assembly.

In some automobiles, it is preferable to mount a differential means between the front and the rear axles, and an intermediate differential gear means, as shown in FIG. 11, may be mounted at the transmission gear 28. Any suitable conventional differential means can be used for such purposes. In the particular example of FIG. 11, axes supporting the bevel pinions 166 and 167 are mounted on the transmission gear 28 at right angles to the axis of the gear 28. Front and rear side gears 168 and 169 are driven by bevel gears 166 and 167, and rotated at the same speed as that of the transmission gear 28 under normal conditions but at a different speed therefrom under the condition of differential operation. The side gears 168 and 169 are connected to the front and rear propeller shafts 161 and 162 respectively to drive them.

The speed change device of FIG. 1 is suitable for a four-wheel drive vehicle, and if it is applied to a front-drive vehicle, the propeller 162, the bevel pinion 163', and the bevel gear wheel 164' can be dispensed with. On the contrary, in the case of a rear-drive vehicle, the propeller shaft 161, the bevel pinion 163, and the bevel gear wheel 164 can be dispensed with.

case of the first embodiment, the output speed can be varied in four forward stages and one rearward stage. The power transmission routes in the second embodiment can be easily traced by those skilled in the art from the aforesaid description on the first embodiment, and accordingly, such transmission routes will not be described in detail hereinafter. Table II shows operative conditions of various clutches and brakes of the second embodiment as well as the speed change ratio for each operative stage thereof. It is apparent from FIG. 3 and Table II that, the power is transferred through a route including the turbine 3 of the torque converter V in the forward first and second and the rearward stages, through both of the two split routes comprising the route including said turbine and another route including the mechanical clutch 65, 66 in the forward third stage, and through said other route in overdrive fashion in the forward fourth stage. What is meant by "overdrive" here is the condition in which the output gear 20 is rotated at a speed faster than that of the input shaft, namely the crankshaft 1.

TABLE II

| Operative stage | Forward first | Forward second | Forward third | Forward fourth | Rearward |
|---|---|---|---|---|---|
| Forward clutch (50, 51) | Engaged | Engaged | Engaged | Disengaged | Disengaged. |
| Rearward clutch (52, 53) | Disengaged | Disengaged | Disengaged | do | Engaged. |
| Direct connection clutch (65, 66) | do | do | Engaged | Engaged | Disengaged. |
| First brake (64) | (Actuated) | Released | Released | Released | Actuated. |
| Second brake (54) | Released | Actuated | do | Actuated | Released. |
| One-way brake (63) | Engaged | Disengaged | Disengaged | Disengaged | Disengaged. |
| Speed change ratio | $l_R/l_S$ | $\dfrac{l_R(1+l_S)}{l_S(1+l_R)}$ | 1 | $\dfrac{l_R}{(1+l_R)}$ | $-l_R$. |

Figure 4:
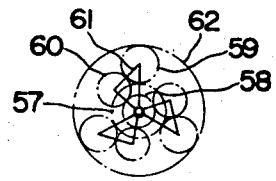
FIG. 4 is a diagrammatic illustration similar to FIG. 2, showing the manner in which various gear elements of a planetary gear assembly usable in the device of FIG. 3 are engaged each other.

FIGS. 3 and 4 illustrate a second embodiment of the present invention, in which reference numerals 1 to 13, 20, 28, 161 to 165, and 163' designate the same components as those represented by such reference numerals in FIG. 1. The second embodiments differs from the first embodiment in a planetary gear assembly, clutches, brakes, and coupling between such components. Such different components will now be described in detail.

The planetary gear assembly of the second embodiment comprises a first sun gear 57, a second sun gear 58, first planet gears 59, second planet gears 60, a carrier 61 pivotally supporting the first and the second planet gears, and an internal gear 62. The various gear elements of the planetary gear assembly are meshed with each other as shown in FIG. 4, wherein each gear element is represented by a pitch circle thereof for simplicity; namely, the first and sun gears 57,58 are meshed with the first and second planet gears 59 and 60 respectively, and at the same time, each first planet gear 59 is meshed with one of the second planet gears 60 and the internal gear 62 simultaneously.

A forward clutch comprises a forward clutch body 50 connected to a transmission shaft 25 and a forward clutch plate 51 connected to the second sun gear 58 through an intermediate shaft 55. A rearward clutch comprises a rearward clutch body 52 connected to the first sun gear 57 through a hollow shaft 56, and a rearward clutch plate 53 connected to the forward clutch body 50. A direct connection clutch comprises a direct connection clutch body 65 connected to the carrier 61, and direct connection plate 66 connected with a transmission shaft 24. When a first brake 64 is actuated the direct connection clutch body 65 is stopped, while when a second brake 54 is actuated the rearward clutch body 52 is stopped.

An output gear 20 is coupled with the internal gear 62 and disposed coaxially on the hollow shaft 56 so as to be rotatable thereon. A one-way brake 63 allows rotation of the direct connection clutch body 65 and the carrier 61 in the normal direction but not in the opposite direction.

With the speed change device of FIG. 3, by automatically controlling the conditions of various clutches and brakes thereof by suitable hydraulic means (not shown), as in the Notes:

1. In Table II, $l_R$ and $l_S$ are per unit values of the pitch circle radii of the internal gear 62 and the second sun gear 58 respectively, based on the pitch circle radius of the first sun gear 57.

2. There are following relations between the revolving speeds of the first sun gear 57, the second sun gear 58, the internal gear 62 and the carrier 61, which are represented by $S_1$, $S_2$, R, and C respectively.

$$C(l_R+1) = S_1 + Rl_R$$
$$C(l_S+1) = S_1 + S_2 l.$$

The speed change ratios of Table II are determined by substituting zero to the revolving speed of each member, which is held stationary during each particular stage of operation, in the aforementioned formulae.

In fact, the speed change ratio $m$ for the forward first, second, and third stages is a quotient of the revolving speed of the second sun gear 58 divided by that of the internal gear 62, namely $S_2/R$; for the forward fourth stage it is a quotient of the revolving speed of carrier 61 divided by that of the internal gear 62, namely $C/R$; and for the rearward stage it is a quotient of the revolving speed of the first sun gear 57 divided by that of the internal gear 62, namely $S_1/R$.

3. The reason why the condition of the first brake during the forward first stage is parenthesized in Table II is as follows. During the normal operation of the speed change device in the forward first stage, various resistive forces acting on the carrier 61 from the outside tend to rotate the same in the nonnormal direction, however such tendency can be effectively hampered by the one-way brake 63 without necessitating the actuation of the first brake 64, and the carrier is held stationary. On the other hand, if engine brake is applied, for instance during coasting along a downward slope, the carrier 61 tends to be rotated in the normal direction, and the one-way brake 63 is not capable of hampering such tendency. Therefore, the first brake 64 is actuated when engine brake is applied in order to prevent the carrier from rotating in the normal direction.

In the second embodiment, it is permissible to mount an intermediate differential gear means as shown in FIG. 11 at the transmission gear 28 in the same manner as the first embodiment.

Figure 5:
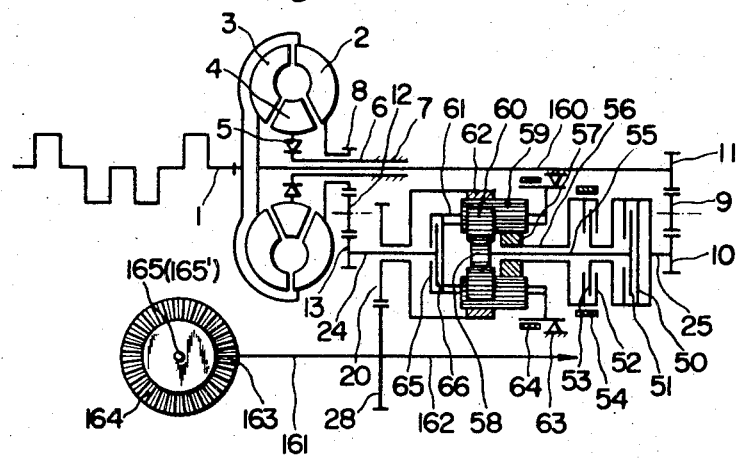
FIGS. 5 to 9 are skeleton diagrams of third to seventh embodiments of the present invention, respectively.

FIG. 5 illustrates a third embodiment of the present invention, in which reference numerals 1 to 13, 20, 28, and 160 to 165 designate substantially the same components as those represented by the corresponding reference numerals in the first and the second embodiments described hereinbefore referring to FIGS. 1 and 3. Furthermore, construction and connection of a planetary gear assembly and various clutches and brakes are identical with those of the second embodiment (FIG. 3). Accordingly, such same components and identical construction and connection will not be described in detail hereinafter.

The third embodiment of the invention of FIG. 5 is different from the second embodiment of FIG. 3 in the following construction. In FIG. 3, the transmission gear rotatable around the long spindle 160 is coupled with the turbine 3 and the long spindle is connected to the pump 2, while in FIG. 5, the transmission gear 8 rotatable around the long spindle 160 is coupled with the pump 2 and the long spindle 160 is connected to the turbine 3.

In comparison of FIGS. 3 and 5, it is apparent that a unit including the planetary gear assembly, various clutches, and two brakes of FIG. 3 is disposed in the speed change device of FIG. 5 only by turning it around horizontally by 180°. Consequently, the operation and effects of the speed change device of FIG. 5 are the same as those of FIG. 3.

In other words, the power from the pump 2 in FIG. 5 is transferred to a transmission gear 8 rotatable around the long spindle 160, but not to the transmission gear 11 as in the case of FIG. 3. However, after the rotary member 8, the power from the pump 2 is transferred to the same transmission route including gears 12 and 13 and a shaft 24 connected to a clutch plate 66 as that of FIG. 3. The power from the turbine 3 in FIG. 5 is transferred to the same route including the gears 9 and 10 and a shaft 25 connected to a forward clutch body 50 as that of FIG. 3, but through the long spindle 160 and a transmission gear 11 and not through the rotary member of the transmission gear 8 rotatable around the long spindle 160. Therefore, the conditions of various clutches and brakes and speed change ratios of the third embodiment in each operative stage thereof are the same as those of the second embodiment (Table II).

In the third embodiment, it is also permissible to mount an intermediate differential gear means as shown in FIG. 11 at the transmission gear 28 in the same manner as in the first and second embodiments.

Figure 6:
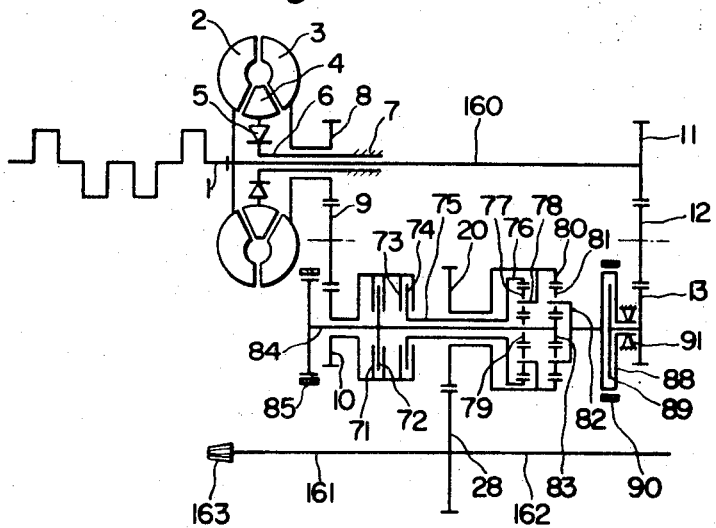

FIG. 6 shows a fourth embodiment of the invention, in which two planetary gear assemblies of simple construction are used to enable four forward stages and one rearward stage of operation. In forward first, second, and rearward operative stages of this fourth embodiment, power is transmitted through a route including a rotary member 8 connected to a turbine 3 of a torque converter, while in the forward third stage, power is transmitted through two split routes, and in the forward fourth stage, overdrive is achieved through a mechanical transmission route including a long spindle 160 connected to a pump 2 of the torque converter V. The input mechanism up to transmission gears 10 and 13 and the output mechanism subsequent to an output gear 20 of the fourth embodiment are substantially identical with corresponding mechanisms of the preceding embodiments, and the operation thereof is apparent to those skilled in the art, and accordingly, such mechanisms will not be described in detail hereinafter.

A rearward clutch comprises a rearward clutch body 71 and a rearward clutch plate 72, while a forward clutch comprises a forward clutch body 73 and a forward clutch plate 74. The planetary gear assemblies of this embodiment include a first unit consisting of a first internal gear 76, first planet gears 77, a first carrier 78 supporting the first planet gears 77, and a first sun gear 79, and a second unit consisting of a second internal gear 80, second planet gears 81, a second carrier 82 supporting the second planet gears 81, and a second sun gear 83. The first and second sun gears 79, 83 are connected to a common shaft 84, which is in turn engageable with a second brake 85. The first internal gear 76 is joined with the forward clutch plate 74 through a hollow shaft 75, while the first carrier 78 is bonded to the second internal gear 80, and the carrier 78 and the gear 80 thus bonded are joined integrally with the output gear 20. The second carrier 82 is joined with a direct connection clutch body 88, which is engageable with a first brake 90 and a direct connection clutch plate 89 secured to the transmission gear 13. A one-way brake 91 is provided to allow rotation of the direct connection clutch body 88 in the normal direction but not in the opposite direction. Thus, the direct connection clutch plate 89 is adapted to receive power from a crankshaft 1 through a mechanical transmission route including the pump 2, the long spindle 160 and gears 11, 12, 13.

Power transmission routes of the fourth embodiment of the invention as shown in FIG. 6 can be easily traced for each operative stage thereof by those skilled in the art from the first embodiment (FIG. 1), and description of such transmission routes will not be repeated here. The operative positions of various clutches and brakes of the fourth embodiment in each operative stage thereof are shown in Table III together with speed change

TABLE III

| Operative stage | Forward first | Forward second | Forward third | Forward fourth | Rearward |
| --- | --- | --- | --- | --- | --- |
| Forward clutch (73, 74) | Engaged | Engaged | Engaged | Disengaged | Disengaged. |
| Rearward clutch (71, 72) | Disengaged | Disengaged | Disengaged | do | Engaged. |
| Direct connection clutch (88, 89) | do | do | Engaged | Engaged | Disengaged. |
| First brake (90) | (Actuated) | Released | Released | Released | Actuated. |
| Second brake (85) | Released | Actuated | do | Actuated | Released. |
| One-way brake (91) | Engaged | Disengaged | Disengaged | Disengaged | Disengaged. |
| Speed change ratio (m) | $2+1/l$ | $1+1/l$ | $1$ | $l/(1+l)$ | $-l$. |

Notes:

1. If it is assumed that $l_1$ and $l_2$ represent a per unit value of the pitch circle radius of the first internal gear 76 based on the pitch circle radius of the first sun gear 79 and a per unit value of the pitch circle radius of the second internal gear 80 based on the pitch circle radius of the second sun gear 83, respectively, then there are following relations between the revolving speeds of the first sun gear 79, the first internal gear 76, the first carrier 78, the second sun gear 83, the second internal gear 80, and the second carrier 82, which are represented by $S_1, R_1, C_1, S_2, R_2,$ and $C_2$, respectively.

$C_1(1+l_1) = S_1 + l_1 R_1$
$C_2(1+l_2) = S_2 + l_2 R_2$
$C_1 = R_2 \quad S_1 = S_2$ If it is assumed that $l_1 = l_2 = l$ for simplicity of calculation, then one obtains the following relations.

$C_1(1+l) = S_1 + lR_1 \quad (\alpha')$
$C_2(1+l) = S_2 + lR_2 \quad (\beta'')$

The speed change ratios of Table III are determined by substituting zero to the revolving speed of each member, which is held stationary during each particular stage of operation, in the aforementioned formulae $(\alpha')$ and $(\beta')$.

2. The relations between the first brake 90 and the one-way brake 91 during the forward first stage, as shown in Table III, are the same as those of the third type embodiment (Table III).

Figure 7:
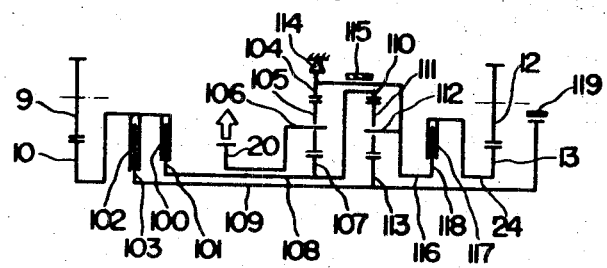
Figure 8:
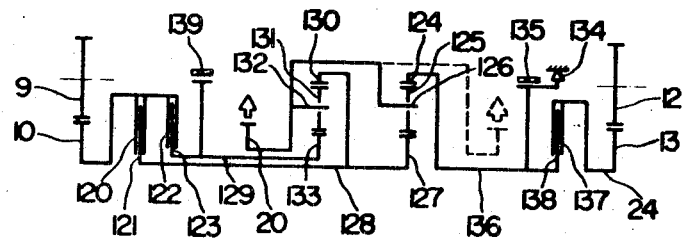
Figure 9:
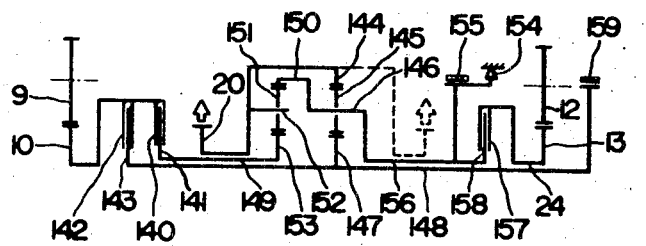

FIGS. 7 to 9 show fifth, sixth, and seventh embodiments of the present invention, in which two planetary gear assemblies of simple construction are used as in the fourth embodiment of FIG. 6. The same input crankshaft 1, torque converter V, output transmission gear 28, propeller shaft 161, and subsequent output means as those of the preceding embodiments can be used in those fifth, sixth, and seventh embodiments. Hence, such same components are not illustrated in FIGS. 7 to 9, and only substantially unique portions of each embodiment are shown therein, namely combinations of gear elements of planetary gear assemblies and connection and engagement between the planetary gear assemblies and various clutches and brakes are shown. For simplicity, only upper halves above the axial centerlines of the planetary gear assemblies each embodiment are shown in the FIGS.

The fifth embodiment will now be described referring to FIG. 7. A forward clutch comprises a forward clutch body 100 and a forward clutch plate 101, while a rearward clutch comprises a rearward clutch body 102 and a rearward clutch plate 103. The planetary gear assemblies comprises a first unit including a first internal gear 104, first planet gears 105, a first carrier 106 supporting the first planet gears 105, and first sun gear 107, and a second unit including a second internal gear 110, second planet gears 111, a second carrier 112 supporting the second planet gears 111, and a second sun gear 113. The first internal gear 104 is bonded to the second carrier 112, and the gear 104 and the carrier 112 thus bonded are connected to a direct connection clutch plate 118 through a hollow shaft 116. A direct connection clutch body 117 cooperating with the direct connection clutch plate 118 is connected to a transmission gear 13. Thus, the power of a crankshaft 1 is directly transferable to the planetary gear assemblies through a mechanical route including the direct connection clutch 117, 118.

On the other hand, the first sun gear 107 and the second internal gear 110 are bonded together and connected to the forward clutch plate 101, while the second sun gear 113 is connected to the rearward clutch plate 103. Therefore, the output power from the turbine of the torque converter is transferable to the planetary gear assemblies through the forward clutch 100, 101 during forward operative stages, or through the rearward clutches 102, 103 during rearward operative stage.

A one-way brake 114 is provided to allow rotation of the first internal gear 104 and the second carrier 112 in the normal direction but not in the opposite direction. A first brake 115 is actuatable to stop the rotation of the first internal gear 104 and the second carrier 112, while the second brake 119 is actuatable to stop rotation of the second sun gear 113. An output gear 20 is integrally connected to the first carrier 106.

bodiment (FIG. 1), and description of such transmission routes will not be repeated here. The operative positions of various clutches and brakes of the fifth embodiment in each operative stage thereof are shown in Table IV together with speed change ratios.

TABLE IV

| Operative stage | Forward first | Forward second | Forward third | Forward fourth | Rearward |
|---|---|---|---|---|---|
| Forward clutch (100, 101) | Engaged | Engaged | Engaged | Disengaged | Disengaged. |
| Rearward clutch (102, 103) | Disengaged | Disengaged | Disengaged | do | Engaged. |
| Direct connection clutch (117, 118) | do | do | Engaged | Engaged | Disengaged. |
| First brake (115) | (Actuated) | Released | Released | Released | Actuated. |
| Second brake (119) | Released | Actuated | do | Actuated | Released. |
| One-way brake (114) | Engaged | Disengaged | Disengaged | Disengaged | Disengaged. |
| Speed change ratio ($m$) | $l+1$ | $\frac{(l+1)^2}{(l^2+l+1)}$ | 1 | $\frac{(l+1)}{(l^2+l+1)}$ | $-l(l+1)$. |

Notes:
1. The speed change ratios of Table IV are determined in the same manner as those of the fourth type embodiment described hereinbefore referring to Table III.
2. The relations between the first brake 115 and the one-way brake 114 during the forward first stage of the operation, as shown in Table IV, are the same as those of the third type embodiment (Table II).

The sixth type embodiment will now be described referring to FIG. 8. Thus type embodiment has a structure identical with that of the fifth type embodiment (FIG. 7) except for modifications in interconnections between movable members of planetary gear assemblies. Since such modifications are apparent to those skilled in the art from comparison of FIGS. 7 and 8, no detailed description of the structure will be made hereinafter. Routes for power transmission in the device of FIG. 8 can be easily traced in the same manner as described hereinbefore referring to the first type embodiment (FIG. 1), and detailed description of such transmission routes will not be repeated here, except the following modifications on the preceding fifth embodiment. Namely, in FIG. 8, a first internal gear 130 and a second sun gear 127 are connected together and associated with a torque converter through a forward clutch comprising a clutch body 120 and a clutch plate 121, and first and second carriers 132 and 126 and bonded together and connected to an output means 20. A first sun gear 133 is associated with the torque converter through a rearward clutch comprising a clutch body 122 and a clutch plate 123 while being engageable with a second brake 139, and a second internal gear 124 is associated with a second route through a direct connection clutch comprising a clutch body 137 and a clutch plate 138 while being engageable with a first brake 135.

The operative positions of various clutches and the brakes of the sixth embodiment for each operative stage thereof are shown in Table V together with speed change ratios therefor.

In this sixth embodiment, it is permissible to mount the output gear 20 either to the left of the planetary gear assembly, as shown by solid lines in FIG. 8, or to the right of the planetary gear assembly, as shown by dotted lines in the FIG. The location of the output gear 20 can be determined so as to suit particular structure and arrangement of a vehicle on which the speed change device is to be mounted.

TABLE V

| Operative stage | Forward first | Forward second | Forward third | Forward fourth | Rearward |
|---|---|---|---|---|---|
| Forward clutch (120, 121) | Engaged | Engaged | Engaged | Disengaged | Disengaged. |
| Rearward clutch (122, 123) | Disengaged | Disengaged | Disengaged | do | Engaged. |
| Direct connection clutch (137, 138) | do | do | Engaged | Engaged | Disengaged. |
| First brake (135) | (Actuated) | Released | Released | Released | Actuated. |
| Second brake (139) | Released | Actuated | do | Actuated | Released. |
| One-way brake (134) | Engaged | Disengaged | Disengaged | Disengaged | Disengaged. |
| Speed change ratio ($m$) | $l+1$ | $(l+1)/l$ | 1 | $\frac{(l^2-1)}{l^2}$ | $-(l^2-1)$. |

Power transmission routes of the fifth embodiment of the invention as shown in FIG. 7 can be easily traced for each operative stage thereof by those skilled in the art from the first em- In Table V, the manner in which the speed change ratios are determined and the relations between the first brake 135 and the one-way brake 134 during the forward first stage are the same as those of Table IV.

The seventh type embodiment of the present invention will now be described referring to FIG. 9. Except for interconnections between movable members of planetary gear assemblies, the structure of the seventh type embodiment is identical with that of the fifth type embodiment (FIG. 7), and hence detailed description of the structure will not be made hereinafter. The procedure for determining routes for power transmission in each speed change stage is identical with that of the first type embodiment (FIG. 1), and accordingly no detailed description thereof will be made hereinafter, except the following modifications on the preceding fifth embodiment. Namely, a first internal gear 150 and a second carrier 146 are bonded together and associated with a second route through a direct connection clutch comprising a clutch body 157 and a clutch plate 158 while being engageable with a first brake 155, and a first carrier 152 and a second internal gear 144 are bonded together and connected to an output means 20. A first sun gear 153 is associated with a torque converter through a rearward clutch comprising a clutch body 140 and a clutch plate 141, and a second sun gear 147 is associated with the torque converter through a forward clutch comprising a clutch body 142 and a clutch plate 143 while being engageable with a second brake 159.

Table VI shows conditions of each clutch and brake during each operative stage, together with the speed change ratios therefor. In this embodiment, it is also permissible to mount the output gear 20 either to the left of the planetary gear assemblies, as illustrated by solid lines in FIG. 9, or to the right of the planetary gear assemblies, as shown by dotted lines in the FIG. The location of the output gear can be determined so as to suit the particular structure and arrangement of a vehicle on which the speed change device of the invention is mounted. In Table VI, the manner in which the speed change ratios are determined and the relations between a first brake 155 and a one-way brake 154 during the forward first stage of operation are the same as the corresponding manners and relations in Tables IV and V.

Figure 12:
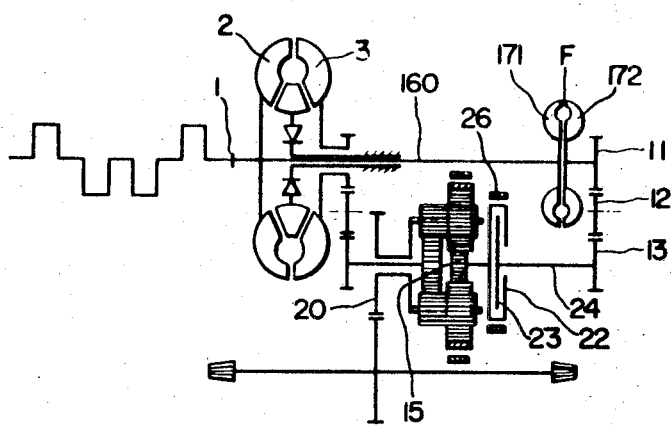
FIG. 12 is a skeleton diagram of another embodiment of the present invention including a fluid coupling mounted at one end of a long spindle.

Furthermore, in the preceding embodiments, a direct connection clutch is inserted in said other power transmission route from said crankshaft 1 to the planetary gear assembly through the pump 2, and at the moment when such direct connection clutch is engaged, there is a possibility of producing a rapid variation in the revolving speed of the output gear 20. Mechanical shocks due to such rapid speed variation of the output gear 20 can be prevented by inserting a fluid coupling F in the aforementioned other transmission route, as shown in FIG. 12. Such fluid coupling can be used with any one of the preceding embodiments, and the application of such fluid coupling will now be described by taking an example, in which a fluid coupling is used in the first type embodiment.

FIG. 12 is a skeleton diagram of a modification of the speed change device of the first embodiment (FIG. 1) by providing a fluid coupling F located between one end of a long spindle 160 and the other transmission route including a direct connection clutch 22, 23. In the device of FIG. 12, the fluid coupling comprises a pump 171 and a turbine 172. During low speed operation, the clutch 22, 23 is disengaged, and a brake 26 is actuated to hold the clutch body 22 stationary. In this case, the turbine 172 is rotated at the same speed as the long spindle 160 and a crankshaft 1, but there is no torque transmitted through the fluid coupling F.

During high speed operation, the brake 26 is released, and the clutch 22, 23 is engaged. At the moment of the engagement of the clutch 22, 23 upon release of the brake 26, the clutch body 22 which has been kept stationary acts to slow down the revolving speeds of various machine elements between the clutch plate 23 and the turbine 172. Under these conditions, if there should be no fluid coupling, the revolving speed of the crankshaft 1 tends to be slowed down, but due to the large inertia of the crankshaft 1, a considerably large shock is exerted on the output gear 20. On the other hand, if there is provided a fluid coupling F inserted in the power transmission route, as illustrated in FIG. 12, the quick variation of the revolving speed of the crankshaft 1 can be ab-

TABLE VI

| Operative stage | Forward first | Forward second | Forward third | Forward fourth | Rearward |
| --- | --- | --- | --- | --- | --- |
| Forward clutch (140, 141) | Engaged | Engaged | Engaged | Disengaged | Disengaged. |
| Rearward clutch (142, 143) | Disengaged | Disengaged | Disengaged | Disengaged | Engaged. |
| Direct connection clutch (157, 158) | do | do | Engaged | Engaged | Disengaged. |
| First brake (155) | (Actuated) | Released | Released | Released | Actuated. |
| Second brake (159) | Released | Actuated | do | Actuated | Released. |
| One-way brake (154) | Engaged | Disengaged | Disengaged | Disengaged | Disengaged. |
| Speed change ratio ($m$) | $l+1$ | $\frac{(2l+1)}{(l+1)}$ | 1 | $l/(l+1)$ | $-1$. |

The split torque type automatic speed change device of the present invention, as described in the foregoing referring to the first to seventh embodiments illustrated in the drawings, is suitable for a vehicle having an engine disposed in parallel with the longitudinal direction of the vehicle, which is of various types of construction, such as front-engine four-wheel-drive type, rear-engine four-wheel-drive type; front-engine front-drive type, front-engine rear-drive type, rear-engine front-drive type, or rear-engine rear-drive type.

In each of the embodiments of the invention described in the foregoing, a torque converter is used as a hydraulic power transmission means to be mounted at one end of the crankshaft 1. However, if it is not required to transmit a large torque at low speed operation, then such torque converter can be replaced with a fluid coupling. The power transmission route from one end of the long spindle 160 to the planetary gear assembly through the hydraulic power transmission means and the other power transmission route from a rotary member on the long spindle 160 to the planetary gear assembly are formed by the transmission gears 9, 10 and the similar transmission gears 12, 13 respectively, in the case of the preceding embodiments. However, such transmission gears for the transmission routes can be replaced with suitable chains or belts.

sorbed by slip of the fluid coupling F. Thus, the magnitude of that inertia which affects the mechanical shock on the output gear 20 is restricted to a small value, namely to a small inertia including those of the clutch plate 23, the turbine 172, and minor accessories associated therewith. The fluid coupling F transfers only small portion of the output power from the crankshaft 1 to the second sun gear 15, and hence the fluid coupling can be comparatively small.

This fluid coupling F can be inserted between the clutch plate 23 and a transmission gear 13, or at an intermediate point of the shaft 24. If the fluid coupling is mounted on the shaft 24, the inertia of transmission gears 11, 12, 13 are eliminated from the overall inertia affecting the mechanical shock acting on the output gear 20, and only inertia contributing to the shock on the output gear 20 is that of the turbine 172, and the magnitude of such shock is considerably reduced. In addition, it is also permissible to eliminate the clutch 22, 23 by replacing it with a fluid coupling F, so that the transmission and interruption of power can be effected by controlling the flow of operating fluid to the fluid coupling.

As described in the foregoing, according to the present invention, there is provided a torque split type automatic speed change device comprising a hydraulic power transmission means connected to one end of an engine crankshaft, said hydraulic power transmission means including a pump and a turbine, a long spindle disposed along the axial centerline of the hydraulic transmission means and connected to one of said pump and turbine, a rotary member adapted to revolve around the long spindle and connected to the other one of said pump and turbine, and planetary gear assembly disposed in parallel with said long spindle and connected to said hydraulic transmission means through two split power transmission routes consisting of a route including said long spindle and another route including said rotary member, said planetary gear assembly being adapted to synthesize powers transmitted thereto through said two split routes for delivering an output power therefrom.

The invention has been described by taking several different forms of the planetary gear assembly, but the present invention is not restricted only to such forms of planetary gear assembly, but planetary gear assemblies of any suitable form can be used in the device of the invention. Whichever type planetary gear assembly may be used, it is disposed in parallel with the long spindle disposed along the axis of a hydraulic transmission means.

Since the automatic speed change device of the present invention is connected to an engine crankshaft only at one end thereof, the speed change device can be applied to various kinds of engines with ease. Moreover, the propeller shaft of a vehicle can be positioned below the axial centerline of the hydraulic transmission means, and hence, the speed change device of the present invention can be mounted on various vehicles without causing any interference to the floor level of the vehicle.

We claim:

1. A torque split type of automatic speed change device connected to an engine crankshaft comprising a hydraulic torque converter having a pump, a turbine and a stator; a torque converter brake allowing said stator to rotate only in the same direction as said engine crankshaft; a long spindle axially aligned with said torque converter and having one end thereof connected to one end of said pump and said turbine; a direct connection clutch operatively connected to said long spindle; a rotary member revolving around said long spindle and connected to the other of said pump and said turbine; two split power transmission routes consisting of a route including said long spindle, said direct connection clutch and a first brake and another route including said rotary member; a second brake; a planetary gear assembly disposed in parallel with said long spindle and connected to said torque converter through said two split power transmission routes, said planetary gear assembly synthesizing powers transmitted thereto through said two split power transmission routes for producing an output power; an output means receiving said output power from said planetary gear assembly, said planetary gear assembly having a first sun gear operatively connected to said rotary member; a second sun gear operatively connected to said long spindle through said direct connection clutch and engageable with said first brake; an internal gear engageable with said second brake, first planet gears meshed with said first sun gear, second planet gears meshed with both said second sun gear and said internal gear, each said said first planet gear being meshed with one of said second planet gears, and a carrier pivotally holding said first and second planet gears and connected to said output means, whereby said first brake is actuated while releasing said second brake for driving said output means at a forward low speed stage, said direct connection clutch is engaged while releasing said first and second brakes for driving said output means at a forward high speed stage, and said second brake is actuated while disengaging said direct connection clutch and releasing said first brake for driving said output means in a rearward direction.

2. A speed change device according to claim 1 wherein said long spindle is connected to said pump of said torque converter, said rotary member is connected to said turbine of said torque converter, and said output means extends from said planetary gear assembly toward said torque converter.

3. A speed change device according to claim 2, wherein said other transmission route includes a fluid coupling inserted therein.

4. A speed change device according to claim 1, wherein said long spindle is connected to said turbine of said torque converter, said rotary member is connected to said pump of said torque converter, and said output means extends from said planetary gear assembly away from said torque converter.

5. A speed change device according to claim 4, wherein said other transmission route includes a fluid coupling inserted therein.